United States Patent [19]

Shay

[11] 4,235,200

[45] Nov. 25, 1980

[54] AUTOMATIC ANIMAL FEEDER

[76] Inventor: Michael A. Shay, 8272 Myrtlewood Cir., Westminster, Calif. 92683

[21] Appl. No.: 16,118

[22] Filed: Feb. 26, 1979

[51] Int. Cl.³ .............................................. A01K 5/02
[52] U.S. Cl. ................................ 119/51.11; 119/56 R
[58] Field of Search ........................ 119/51.11, 56 R; 222/70, 362

[56] References Cited

U.S. PATENT DOCUMENTS

| | | | |
|---|---|---|---|
| 2,538,413 | 1/1951 | Chard | 119/51.11 X |
| 3,131,673 | 5/1964 | Rudd | 119/56 R |
| 3,279,434 | 10/1966 | Evans | 119/56 R |

Primary Examiner—Hugh R. Chamblee
Attorney, Agent, or Firm—Ira M. Siegel

[57] ABSTRACT

An automatic animal feeder comprising a housing wherein is contained a hopper for storing large amounts of dry food and a food delivery chamber positioned below said hopper for holding a fixed portion of dry feed received from said hopper. The food delivery chamber pivots at regular intervals from a loading position to a delivery position whereby the fixed portion of dry feed is discharged into an area accessible to an animal.

16 Claims, 5 Drawing Figures

AUTOMATIC ANIMAL FEEDER

BACKGROUND OF THE INVENTION

1. Field of the Invention

This invention relates to apparatus for feeding animals preset portions of food at preset times.

2. Prior Art

Devices for delivering feed material to animals, particularly devices for delivering dry feed in granular or pelletized form, have found myriad uses. These devices deliver feed to such animals as fish, dogs, horses and so on. Such devices have proven especially adaptable to fish hatcheries, breeding ranches and farms. They also function well in kennels, other animal shelters and pet shops, as well as the home.

Prior art devices for delivering predetermined amounts of feed at regular intervals possessed numerous disadvantages. Generally they have been expensive to manufacture and have been difficult to maintain. This has been particularly due to the fact that they have comprised a plethora of moving parts, usually inaccessible, which were difficult to clean and susceptible to mechanical failure. Prior art devices have employed such means for delivering feed as centrifugal force, exemplified by U.S. Pat. Nos. 3,800,745 and 3,920,224 issued to Arthur L. Fassauer; track-mounted compartments, exemplified by U.S. Pat. No. 3,434,459 issued to Gloyd W. Green; and mechanical sweepers, exemplified by U.S. Pat. No. 3,827,404 issued to Max D. North. Prior art devices have also been difficult to adapt to both domestic and to large scale uses, usually being intended for one type of use or another, but not more than one. Other examples of prior art devices are exemplified by U.S. Pat. No. 3,716,172 issued to Huston D. Crippen and U.S. Pat. No. 3,587,530 issued to Weston L. Blair.

SUMMARY OF THE INVENTION

The automatic animal feeder of the present invention overcomes the limitations of the prior art devices. It provides a system for delivery of dry food in portioned amounts at regular intervals. It provides a system adaptable for feeding pets or livestock, for use in the home, in animal shelters or kennels, or on farms or ranches. The present invention further provides a food delivery system which is inexpensive to produce and simple to maintain. It further provides the ability to feed almost any number of animals their individual portions and provides flexibility in setting feeding times.

The present invention is an automatic animal feeder. A food storage bin feeds dry food to a food delivery chamber which holds one serving of food. The food delivery chamber pivots on a pin from a loading position (loading mode) to a delivery position (delivery mode). The chamber is held in the loading position by a spring. Upon the activation of a solenoid, the food delivery chamber is pulled down, closing the passageway from the food storage bin to the food delivery chamber, and opening the passageway to a feeding tray. The food in the food delivery chamber then pours out to the feeding tray. The solenoid is activated by a timer so that feed material is delivered to the animals at regular intervals.

More than one timer may be interconnected with the system to allow greater flexibility in regulating the feed time intervals, particularly when numerous animals requiring feeding at different frequencies are being fed by the system of the present invention.

DETAILED DESCRIPTION OF THE INVENTION

Figures 1, 2:
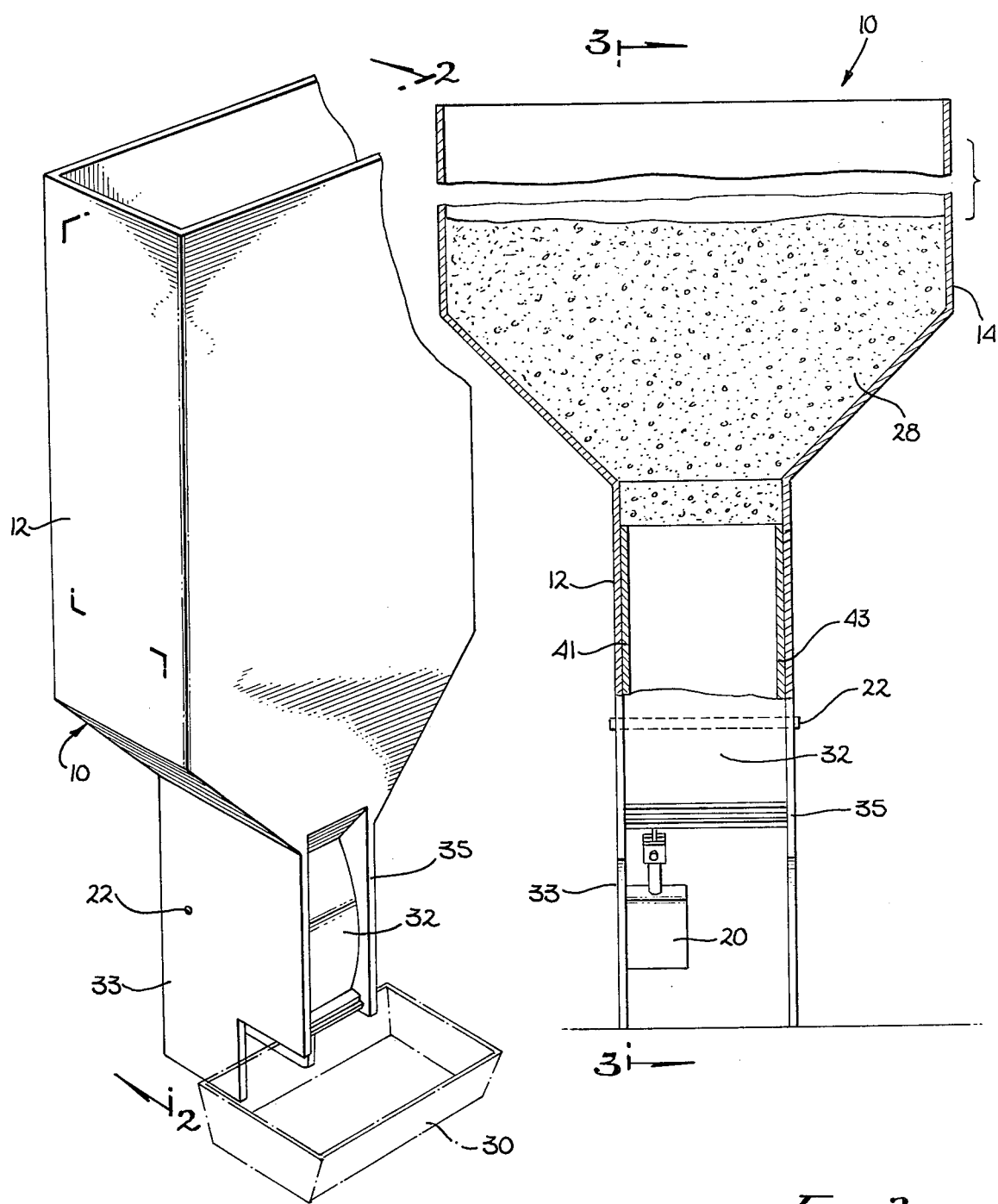
FIG. 1 is a perspective view of the automatic animal feeder according to this invention.
FIG. 2 is a cross sectional view of the automatic animal feeder of the present invention taken along line 2—2 of FIG. 1.

The preferred embodiment of the present invention is described below. In referring to the drawings, the same reference numeral will designate like elements throughout.

FIGS. 1 through 4 illustrate the preferred embodiment of the automatic animal feeder of the present invention, designated generally by numeral 10. The automatic animal feeder is contained in housing 12 and comprises hopper 14 in which dry food 28 is temporarily stored. It further comprises food delivery chamber 16 which is positioned below the hopper and maintained in the loading mode by retention means, specifically spring 18. The food delivery chamber is connected to solenoid 20 which upon being activated pulls the delivery chamber, which pivots on pin 22, into the delivery mode position. When the delivery chamber is in the delivery mode, feed 28 pours into feeding tray 30 or any other suitable recepticle and is available for an animal to feed upon.

Housing 12 may have a removable cover 11, illustrated in FIG. 1, placed over its top. This is usually advisable in order to keep feed 28 clean and dry. Housing 12, hopper 14 and food delivery chamber can be manufactured of almost any rigid material, with steel being one example. However, lightweight metals such as aluminum or magnesium are preferred to steel because they are less expensive to manufacture and much lighter in weight. This inventor prefers to manufacture the invention from rigid, transparent plastic. Thus, an automatic animal feeder is produced which is easy and inexpensive to manufacture, is lightweight so as to provide for easy placement and relocation as desired, and is readily observable for checking the level of feed contained therein.

Food delivery chamber 16 is sized to hold a single portion of food for a particular animal. To accommodate the larger or smaller portions of food required by different animals, the food delivery chamber can be made larger or smaller accordingly. Alternatively, solenoid 20 may be actived more frequently to deliver greater amounts of feed from a food delivery chamber of a fixed size.

Front face 32 of housing 12 is arcuately shaped to allow the free movement of the pivoting food delivery chamber within it. Similarly, front panel 34 of the food delivery chamber is arcuately shaped to fit within front face 32 and to provide an efficiently shaped storage compartment. While in the loading mode, the food delivery chamber is retained in a position so that its receiving opening 38 is aligned with outlet 36 of hopper 14. Lip 42, which is an extension of bottom panel 40 of the food delivery chamber, contacts front face 32 of the housing to close off the food delivery chamber and to prevent it from being pulled up so high by spring 18 that receiving opening 38 is misaligned with outlet 36.

Integral with food delivery chamber 16 is mounting assembly 44. The mounting assembly is mounted on pin 22, which in turn is affixed to housing 12. It is about this pin that the food delivery chamber pivots in changing from the loading mode to the delivery mode.

Chamber 16 is made in larger or smaller sizes to hold correspondingly large or smaller portions of feed 28 in accordance with the needs of the animal for which the automatic animal feeder is intended. Accordingly, bottom panel 40 and top panel 46 and side panels 41 and 43, shown in FIG. 2, are made in bigger or smaller dimensions respectively, with back panel 48 extending between them. Similarly, chamber 16 may be changed in capacity by repositioning back panel 48 or by contouring it. As can be seen, the larger that food delivery chamber 16 is, the smaller is mounting assembly 44, with the entire assembly always taking up the same space. Thus, a single-sized housing 12 may be fitted with any of various sized food delivery chambers. Because only one sized housing need be constructed for a large range of portion sizes, the costs of manufacture are kept low. Further, if the animal for which the automatic animal feeder is intended is changed, or if the portion size is to be changed for any reason whatsoever, only the food delivery chamber with its mounting assembly need be changed.

Walls 50 and 51 of hopper 14 are set at an incline to promote the flow of dry feed 28 toward outlet 36 without any blockage being formed. Similarly, back panel 48 and bottom panel 40 are set at an obtuse angle to each other, approximately 130°, so that they are both at an incline to facilitate proper loading of feed while the food delivery chamber is in the loading mode; and so that they are both at an incline (i.e. back panel 48 disposed about 10° from the vertical and bottom panel 40 disposed about 30° from the horizontal) during the delivery mode to promote the discharge of feed 28 through the exposed discharge opening 54.

As discussed earlier, lip 42 contacts front face 32 to seal off discharge opening 54 while food delivery chamber 16 is in the loading mode. When the food delivery chamber pivots into the delivery mode position, lip 42 moves away from front face 32 and discharge opening 54 moves into the exposed position, allowing feed 28 to flow out. At the same time, divider 58, an extension of the sealing panel 56 of the food delivery chamber, pushes aside the feed which is between outlet 36 and receiving opening 38 and which would otherwise obstruct the pivoting of the food delivery chamber. Sealing panel 56 itself extends upwardly and behind top panel 46 and is arcuately shaped in the same general curve as front face 34. As the food delivery chamber pivots into the delivery mode position, the sealing panel blocks outlet 36. Thus, as the predetermined portion of feed 28 is being delivered into feeding tray 30, no feed leaks from closed off hopper 14 (see FIG. 4). When the food delivery chamber is returned to the loading mode, discharge opening 54 is again covered and receiving opening 38 realigns with outlet 36 allowing a portion of feed to flow from the hopper into food delivery chamber 16 (see FIG. 3).

As can be seen from FIG. 1, food delivery chamber 16 can be made without side panels 41 and 43, and without front panel 34. Sides 33 and 35 and front face 32 of the bottom portion of housing 12 can substitute for the side panels and front panel of the food delivery chamber respectively. Food delivery chamber 16 operates the same way regardless of which embodiment is used.

Figures 3, 4:
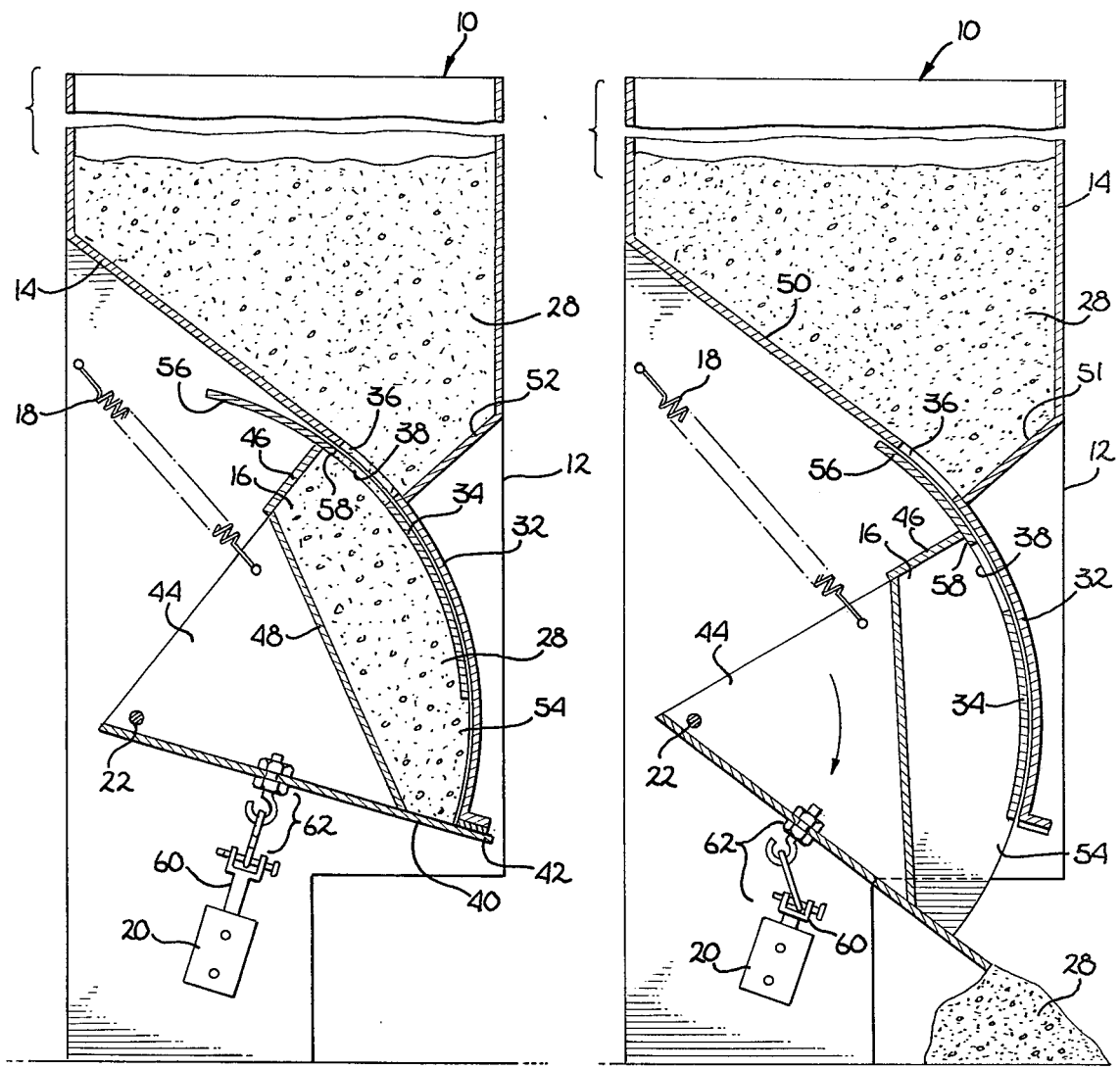
FIG. 3 is a cross sectional view of the present invention in the loading mode taken along line 3—3 of FIG. 2.
FIG. 4 is the cross sectional view as shown in FIG. 3 of the present invention in the delivery mode.

The food delivery chamber periodically pivots into the delivery mode upon being pulled upon by solenoid 20. The solenoid is affixed to housing 12 with its armature 60 connected by connector means 62 to mounting assembly 44. During the loading mode, the solenoid is not activated and its armature is pulled to an extended position, as can be seen in FIG. 3, by retention spring 18 which is attached to housing 12 and mounting assembly 44. When the solenoid is activated, the armature is drawn into a contracted position, as shown in FIG. 4, and in turn pulls the food delivery chamber into the delivery mode. When the solenoid is deactivated, armature 60 is released from its contracted position and is pulled back to its extended position when retention spring 18 pulls the food delivery chamber into the loading mode (see FIG. 3). The automatic animal feeder remains in the loading mode until solenoid 20 is activated again.

Figure 5:
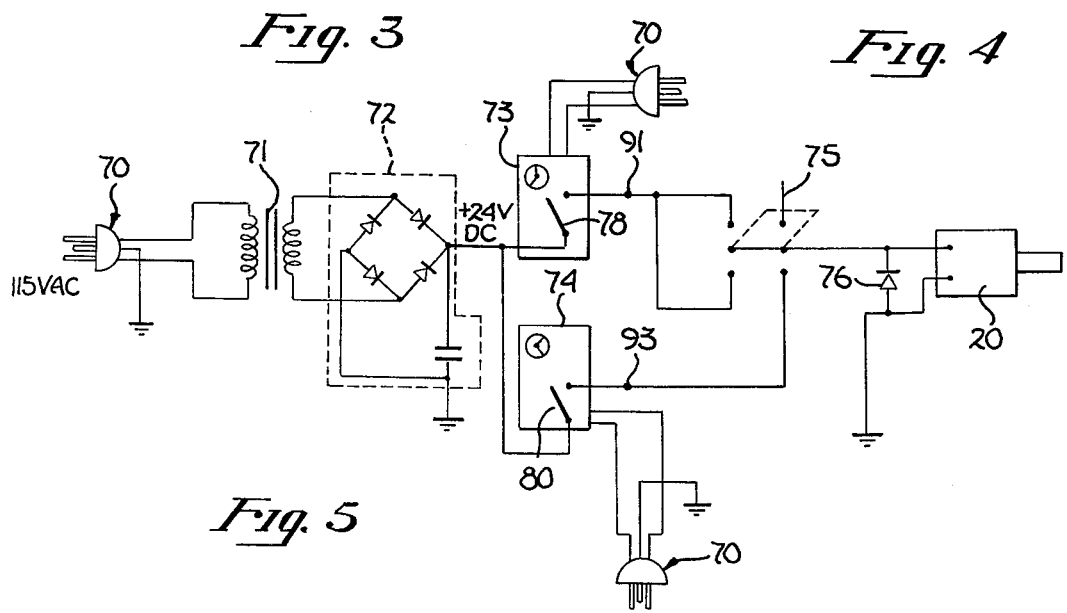
FIG. 5 is a schematic diagram of the timing circuit used in one embodiment of the invention.

Solenoid 20 is activated at predetermined times during the day. FIG. 5 illustrates a timing circuit used typically for controlling solenoids of automatic animal feeders intended for the feeding of rabbits. The circuit is comprised of a conventional 115 volt-alternating current source 70 connected to a step down transformer 71; a bridge rectifier 72 connected to the secondary coil of transformer 71 and which provides a 24 volt-direct current output; two timers (also connected to the conventional 115 volt-alternating current source 70), morning timer 73 and evening timer 74, with the input of each connected to the 24 volt output of the bridge rectifier; a double-pole double-throw switch 75 with on-off-on positions, with the output of the morning timer connected to both input sides of the double-pole double-throw switch and the output of the evening timer connected to only one input side of the switch; solenoid 20 with one of its terminals connected to the output of switch 75 and its other terminal connected to a return line (here represented by the symbol for electrical ground); and diode 76 placed across the terminals of the solenoid.

In this example of feeding rabbits, it should be noted that male rabbits need to be fed only once per day, while female rabbits need to be fed twice. Therefore, switch 75 is set to engage either the morning timer alone or both the morning and evening timers, depending on whether male or female rabbits, respectively, are to be fed by the automatic animal feeder.

Therefore, if a male rabbit is being fed, the double-pole double-throw switch engages only the morning timer. Morning timer 73, which like evening timer 74 is a conventional swimming pool filter pump timer, closes its internal switch 78 for a set period once daily. When the switch closes, solenoid 20 is activated causing its armature 60 to be drawn into the contracted position as discussed above. Switch 78 remains closed for a period long enough to allow all the feed 28 in food delivery chamber 16 to flow out of discharge opening 54. When the set period terminates, switch 78 opens with solenoid 20 consequently being deactivated and armature 60 being pulled to the extended position. Because of the tendency of a solenoid coil to maintain the current within it, arcing would occur across the contacts of switch 78 as it is being opened. This arcing causes deterioration of the switch and premature failure of the timer. To prevent this, diode 76 is placed across the terminals of solenoid 20, with the diode's anode connected to that terminal which is connected to the return line. This "back biased" diode forms a shunt circuit with the solenoid when switch 78 is opened, thereby preventing arcing when switch 78 opens.

If a female rabbit is being fed, double-pole double-throw switch 75 is set to engage both the morning and evening timers. Thus, solenoid 20 is activated twice daily, once when switch 78 of morning timer 73 closes and once when switch 80 of evening timer 74 closes, thereby delivering two portions of feed 28 to the female rabbit.

Timers 73 and 74 can activate thirty 1 amp. solenoids. Therefore, as many as thirty automatic animal feeders, each with its own double-pole double-throw switch 75, which may be affixed to housing 12, and its solenoid 20, are connected in parallel with each other to a single set of timers at junctions 91 and 93. Thus as many as thirty different animals can be fed without the expense of additional timers.

This invention is readily adaptable to residential or commercial applications. it is relatively inexpensive to manufacture and because it has few moving parts, is easy to maintain and will provide many years of dependable service. In the above description the automatic animal feeder has been disclosed by way of a discussion of the preferred embodiment and by way of examples. However, it is clear that modifications and variations may be made without departing from the invention.

I claim:

1. An automatic animal feeder comprising;
   (a) a housing having a opening at its top for letting dry feed pass through, and having an arcuate front face at its bottom portion;
   (b) a hopper contained within the upper portion of said housing for storing large amounts of said dry feed, said hopper having an opening at its top for receiving said dry feed, an outlet at its lowest extremity for allowing said dry feed to descend therefrom, bottom walls set at an incline toward said outlet for promoting the flow of said dry feed toward and through said outlet;
   (c) a food delivery chamber contained within said bottom portion of said housing and positioned below said hopper, said food delivery chamber comprising a back panel, a top panel, a bottom panel, the top and bottom ends of said back panel being coupled to the adjacent ends of said top panel and said bottom panel respectively, thereby forming an enclosure along with said front face and the sides of said bottom portion of said housing, said enclosure receiving dry food from said hopper when said food delivery chamber is in the loading mode with the end of said bottom panel opposite said back panel contacting the lowest edge of said front face thus preventing the loss of any of said dry feed from said enclosure, said top panel having a dividing means extending from said end of said top panel opposite said back panel partially into said enclosure for removing any of said dry feed which may be trapped between said outlet and said front face when said food delivery chamber pivots from said loading mode to the delivery mode, said top panel further having sealing means extending upwards and backwards from said end of said top panel opposite said back panel for closing off said outlet so that said dry feed does not escape from said hopper while said food delivery chamber is in said delivery mode;
   (d) mounting means connected to said food delivery chamber for mounting said food delivery chamber on a pivot pin about which said food delivery chamber pivots from said loading mode to said delivery mode and back, said pivot pin extending transversely across said bottom portion of said housing;
   (e) retention means for retaining said food delivery chamber in and for returning it to one of said delivery and loading modes; and
   (f) means for causing said food delivery chamber to pivot into the other of said modes for a period of time, whereby said food delivery chamber alternately pivots from said loading mode, during which time said portion of said dry feed enters into said food delivery chamber from said hopper, to the delivery mode, during which time said portion of dry feed is discharged from said enclosure of said food delivery chamber into an area accessible to an animal.

2. The automatic animal feeder of claim 1, further comprising a removable cover fitted to the top of said housing.

3. The automatic animal feeder of claim 1, wherein said housing, hopper and food delivery chamber are rigid, transparent plastic.

4. The automatic animal feeder of claim 1, wherein said retention means is a spring connected between said housing and said mounting means.

5. The automatic animal feeder of claim 1, wherein said back panel and said bottom panel are set at an obtuse angle to each other.

6. The automatic animal feeder of claim 5, wherein said obtuse angle is about 130°.

7. The automatic animal feeder of claim 1, wherein said means for causing said food delivery chamber to pivot from one of said modes into the other is a solenoid mounted on said housing, the armature of said solenoid being attached to said mounting means, said solenoid being activated periodically by a timer, whereby said armature is drawn into a contracted position when said solenoid is activated, thereby causing said food delivery chamber to pivot from one mode to the other.

8. The automatic animal feeder of claim 1, wherein said food delivery chamber comprises said back panel, said top panel, said bottom panel, first and second side panels and a arcuately shaped front panel positioned inside said front face of said housing, the top and bottom ends of said back panel being coupled to the adjacent ends of said top panel and said bottom panel respectively, the edges of said first and second side panels being coupled to the adjacent edges of said back, top, bottom and front panels to form an enclosure, said enclosure having a receiving opening between the top end of said front panel and the end of said top panel opposite said back panel for receiving dry food from said hopper when said food delivery chamber is in said loading mode with said receiving opening aligned directly below said outlet, said enclosure further having a discharge opening between the bottom end of said front panel and the end of said bottom panel opposite said back panel for allowing the portion of said dry feed held in said enclosure of said food delivery chamber to be discharged from said food delivery chamber when said food delivery chamber is in said delivery mode with said discharge opening exposed below said front face of said housing, said top panel having a dividing means extending from said end of said top panel opposite said back panel partially into said receiving opening for removing any of said dry feed which may be trapped between said outlet and said receiving opening when said food delivery chamber pivots from said loading mode to the delivery mode, said top panel further having sealing means extending upwards and backwards from said end of said top panel opposite said back panel for closing off said outlet so that said dry feed does not escape from said hopper while said food delivery chamber is in said delivery mode.

9. An automatic animal feeder comprising:
(a) a housing having an opening at its top for letting dry feed pass through, and having an arcuate front face at its bottom portion;
(b) a hopper contained within the upper portion of said housing for storing large amounts of said dry feed, said hopper having an opening at its top for receiving said dry feed and an outlet at its lowest extremity for allowing said dry feed to descend therefrom;
(c) a food delivery chamber contained within said bottom portion of said housing and positioned below said hopper, said food delivery chamber comprising a back panel, a top panel, a bottom panel, the top and bottom ends of said back panel being coupled to the adjacent ends of said top panel and said bottom panel respectively, thereby forming an enclosure along with said front face and the sides of said bottom portion of said housing, said enclosure receiving dry food from said hopper when said food delivery chamber is in the loading mode with the end of said bottom panel opposite said back panel contacting the lowest edge of said front face thus preventing the loss of any of said dry feed from said enclosure, said top panel having a dividing means extending from said end of said top panel opposite said back panel partially into said enclosure for removing any of said dry feed which may be trapped between said outlet and said front face when said food delivery chamber pivots from said loading mode to the delivery mode, said top panel further having sealing means extending upwards and backwards from said end of said top panel opposite said back panel for closing off said outlet so that said dry feed does not escape from said hopper while said food delivery chamber is in said delivery mode;
(d) mounting means connected to said food delivery chamber for mounting said food delivery chamber on a pivot pin about which said food delivery chamber pivots from said loading mode to said delivery mode and back, said pivot pin extending transversely across said bottom portion of said housing;
(e) retention means for retaining said food delivery chamber in and for returning it to one of said delivery and loading modes; and
(f) means for causing said food delivery chamber to pivot into the other of said modes for a period of time, whereby said food delivery chamber alternately pivots from said loading mode, during which time said portion of said dry feed enters into said food delivery chamber from said hopper, to the delivery mode, during which time said portion of dry feed is discharged from said enclosure of said food delivery chamber into an area accessible to an animal.

10. The automatic animal feeder of claim 9, further comprising a removable cover fitted to the top of said housing.

11. The automatic animal feeder of claim 9, wherein said housing, hopper and food delivery chamber are rigid, transparent plastic.

12. The automatic animal feeder of claim 9, wherein said retention means is a spring connected between said housing and said mounting means.

13. The automatic animal feeder of claim 9, wherein said back panel and said bottom panel are set at an obtuse angle to each other.

14. The automatic animal feeder of claim 13, wherein said obtuse angle is about 130°.

15. The automatic animal feeder of claim 9, wherein said means for causing said food delivery chamber to pivot from one of said modes into the other is a solenoid mounted on said housing, the armature of said solenoid being attached to said mounting means, said solenoid being activated perodically by a timer, whereby said armature is drawn into a contracted position when said solenoid is activated, thereby causing said food delivery chamber to pivot from one mode to the other.

16. The automatic animal feeder of claim 9, wherein said food delivery chamber comprises said back panel, said top panel, said bottom panel, first and second side panels and a arcuately shaped front panel positioned inside said front face of said housing, the top and bottom ends of said back panel being coupled to the adjacent ends of said top panel and said bottom panel respectively, the edges of said first and second side panels being coupled to the adjacent edges of said back, top, bottom and front panels to form an enclosure, said enclosure having a receiving opening between the top end of said front panel and the end of said top panel opposite said back panel for receiving dry food from said hopper when said food delivery chamber is in said loading mode with said receiving opening aligned directly below said outlet, said enclosure further having a discharge opening between the bottom end of said front panel and the end of said bottom panel opposite said back panel for allowing the portion of said dry feed held in said enclosure of said food delivery chamber to be discharged from said food delivery chamber when said food delivery chamber is in said delivery mode with said discharge opening exposed below said front face of said housing, said top panel having a dividing means extending from said end of said top panel opposite said back panel partially into said receiving opening for removing any of said dry feed which may be trapped between said outlet and said receiving opening when said food delivery chamber pivots from said loading mode to the delivery mode, said top panel further having sealing means extending upwards and backwards from said end of said top panel opposite said back panel for closing off said outlet so that said dry feed does not escape from said hopper while said food delivery chamber is in said delivery mode.

* * * * *